Dec. 24, 1957  N. A. CRITES  2,817,390
SPRING AND SPRING ASSEMBLY
Filed Feb. 19, 1954  2 Sheets-Sheet 1

INVENTOR.
Nelson A. Crites
BY *Gray, Mase*
*Wildermuth & Dunson*
ATTORNEYS.

Dec. 24, 1957  N. A. CRITES  2,817,390
SPRING AND SPRING ASSEMBLY
Filed Feb. 19, 1954  2 Sheets-Sheet 2
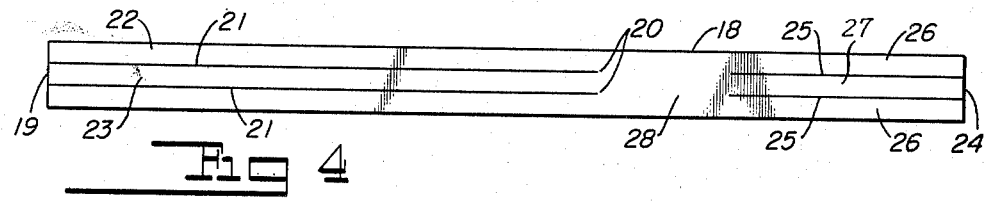
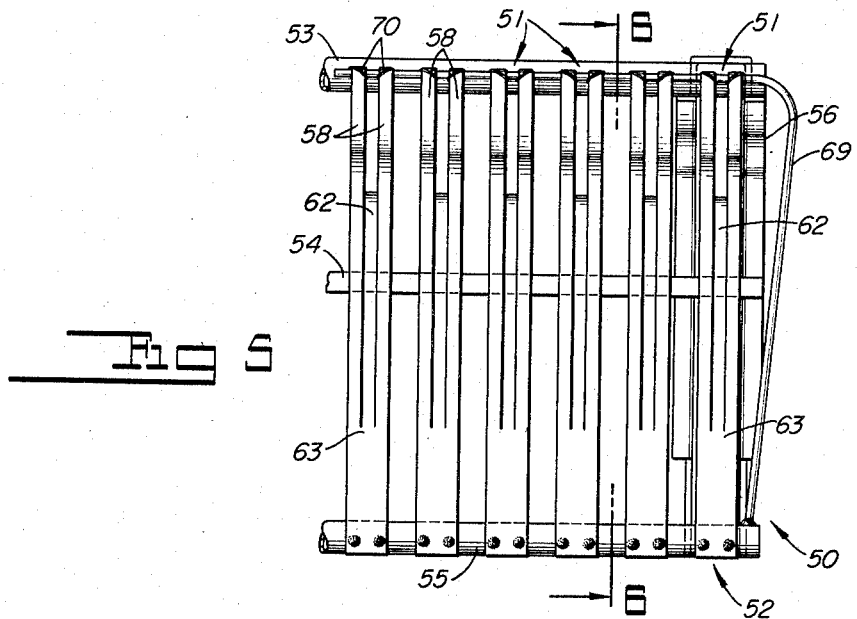
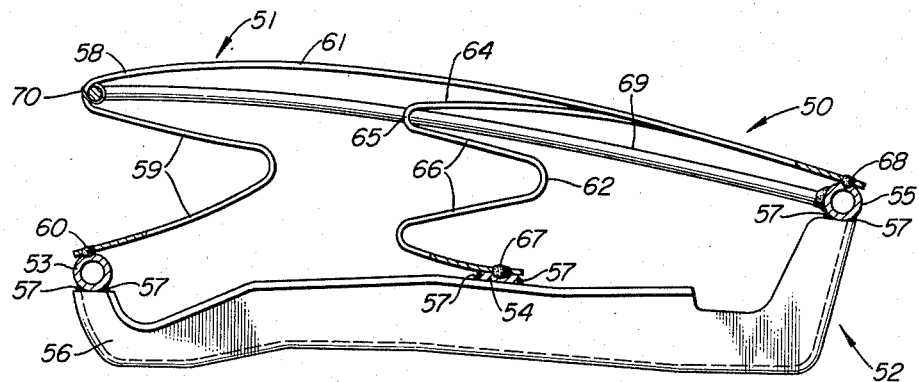
INVENTOR.
Nelson A. Crites
BY Gray, Mase
Wildermuth & Dunson
ATTORNEYS.

United States Patent Office 2,817,390
Patented Dec. 24, 1957

2,817,390

SPRING AND SPRING ASSEMBLY

Nelson A. Crites, Columbus, Ohio, assignor, by mesne assignments, to Rockwell Spring and Axle Company, Coraopolis, Pa., a corporation of Pennsylvania Application February 19, 1954, Serial No. 411,486

8 Claims. (Cl. 155—179)

This invention relates to a spring. It is particularly advantageous when installed in a spring assembly for seating units.

The spring of this invention comprises one piece of flat-spring material, having a slit from at least one end to a position intermediate the ends to form spaced, substantially parallel prongs. At least one of these prongs is shaped to form an end support portion, and at least one of these prongs is shaped to form an intermediate support portion. The remainder of the spring is shaped to form a support at the opposite end. The spring assembly of this invention comprises a plurality of the above-described springs assembled as a base for a seat unit.

Leaf-type springs made from flat, rolled material have been used in the past. Such springs served satisfactorily as a base or frame for seating units in early times. However, as a base or frame for seating units in modern vehicles, such springs have not compared favorably with coil springs and "zigzag" springs made from hard drawn wire. Coil and "zigzag" springs have provided more comfortable riding qualities and longer life. However, use of hard-drawn units requires extensive and expensive tooling to form either coils or "zig-zag" units. Assembly is tedious and expensive.

It has been recognized that "basic" leaf-spring units, i. e., a spring leaf supported at each end, will not produce a seating unit which will meet present-day comfort requirements. Leaves which are soft (thin) enough to be comfortable sag in the middle, while leaves which are hard (thick) enough not to sag are uncomfortable. Intermediate support members have been utilized to prevent sag while utilizing soft leaves. Such intermediate members known in the art require prefabrication expense and assembly costs. Attachment of such intermediate members in place has been a problem. Holes punched for bolts or rivets cause undesirable stress concentrations. Welded connections impair spring properties at the point of connection. Either of these techniques often leads to early spring failure. Intermediate members of known shapes have not provided a variable spring rate which is very soft at slight deflection and which progressively builds up at a faster rate near maximum deflection.

Basic leaf-spring units, resiliently supported at each end, have a tendency to sway forward and backward as such units are used.

It is an object of this invention to provide a spring component for spring assemblies which overcomes the above-described disadvantages of known types.

Accordingly, it is an object of this invention to provide a leaf-spring formed from one piece of flat spring material, and having at least one intermediate support portion. Another object is to provide a leaf spring having at least one intermediate support portion, which does not require attachment to a spring leaf. Still another object is to provide a leaf-spring having at least one intermediate support portion shaped to provide a variable spring rate, which is soft under partial deflection and firm with increased deflection. Another object of this invention is to provide a leaf-spring which has at least one intermediate support portion shaped to form an arcuate portion, which progressively conforms to the contour of the basic leaf, and a Z-shaped portion which is progressively brought into action during deflection of the spring.

It is a further purpose of this invention to provide a spring assembly, comprising a plurality of leaf-springs having at least one intermediate support portion on each spring. Still another object is to provide a spring assembly comprising a plurality of leaf springs having at least one intermediate support portion on each spring which is formed as a part of the spring and requires no attachment thereto. Yet another object is to provide a spring assembly comprising a plurality of leaf springs simple to fabricate and assemble. It is an additional object of this invention to provide a spring assembly comprising a plurality of leaf springs which is comparable in longevity and comfortable riding qualities to coil and "zigzag" spring assemblies.

In the drawings:

Fig. 4 is a plan view of a material blank as used in this invention;

Fig. 5 is a partial plan view of a spring assembly showing another embodiment of this invention; and Fig. 6 is an elevational end view of the embodiment of this invention shown in Fig. 5.

Figure 1:
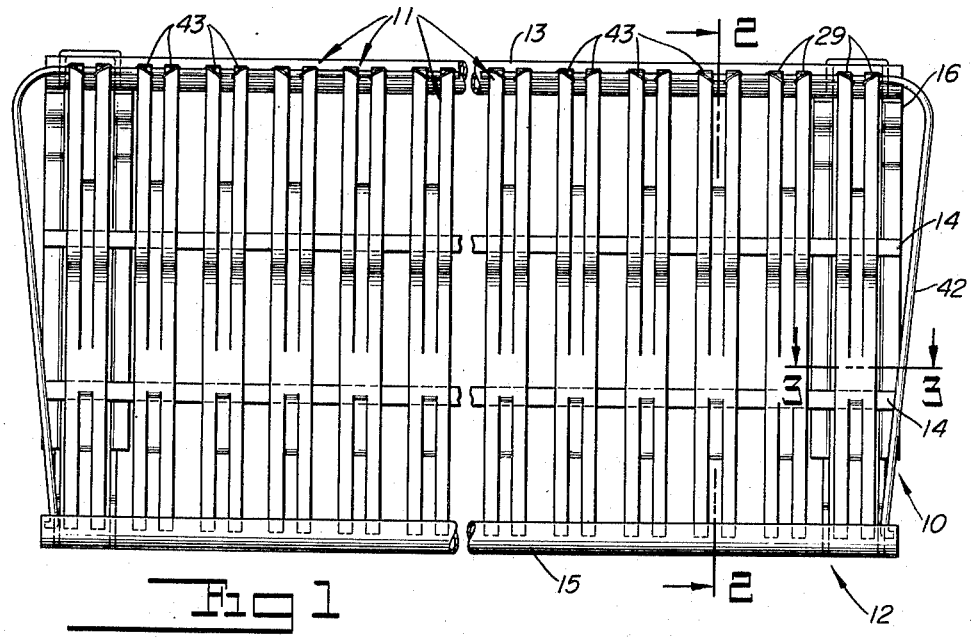
Fig. 1 is a broken plan view of a spring assembly embodying this invention.
Figure 2:
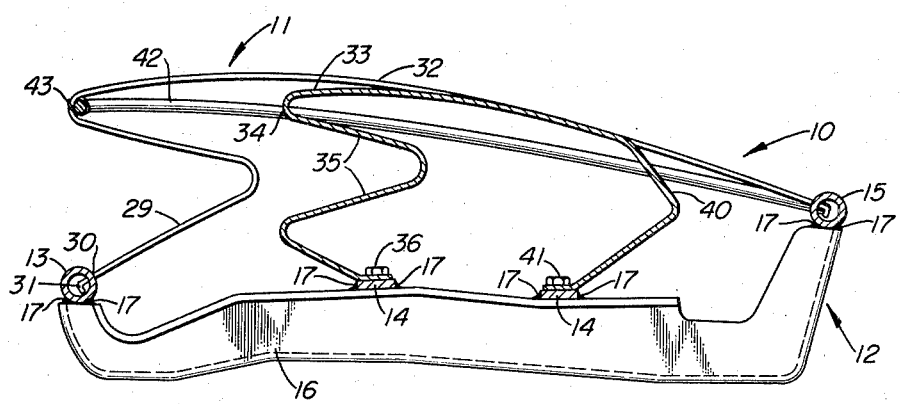
Fig. 2 is a sectional view taken on the line 2—2 of Fig. 1.
Figure 3:
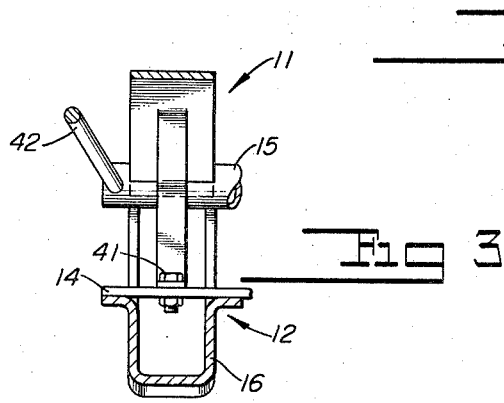
Fig. 3 is an enlarged sectional view taken on line 3—3 of Fig. 1.

Referring to Figs. 1, 2, and 3, a spring assembly designated generally as 10, comprises springs 11—11 assembled to a frame 12. The frame 12 comprises a front tubular member 13, intermediate bar members 14—14, a rear tubular member 15, and formed side members 16—16. The lateral frame members 13, 14—14, and 15 are preferably welded on top of the side members 16—16, as at 17—17, thus providing an integral structural unit.

Each spring 11 is formed of one piece of flat spring stock which has been slit and bent to the configuration shown in Fig. 2. Fig. 4 shows a material blank 18 for a spring 11 which has been slit, according to one embodiment of this invention, from the front end 19 longitudinally and parallel to the long sides of the blank 18 to a position 20 intermediate the ends. Two slits 21—21 are shown, although more or fewer could be used. The slits 21—21 divide the blank 18 into three prong-like protrusions 22—22 and 23. The two prongs 22—22 nearest the longitudinal sides should be equal in size to provide uniform spring action in the finished spring, and may be the same size as the central prong 23.

At the opposite or rear end 24, slits 25—25 divide the blank 18 into prongs 26—26 and 27. As is seen in Fig. 4, an integral portion 28 remains between the ends of the slits 21—21 and 25—25.

Referring to Figs. 1 and 2, the outer front prongs 22—22 are formed in sinuous curved portions 29 which may be described as S shaped and are fastened in the front frame member 13. While the fastening may be accomplished in any suitable well-known manner, the tubular member 13 is shown as slotted with an aperture 30 of similar shape to the cross section of the prong 22. Each prong 22 has formed thereon a hooked end portion 31, which prevents disengagement. The sinuous shaped portion 29 of the prong 22 may be elastically deformed at assembly to engage the hook 31 in the slot 30 and then released allowing the prong 22 to snap back to its usual shape as shown in Fig. 2, thus providing an effective fastening means.

The spring 11 is formed to a gradual arcuate shape 32 to the rear frame member 15. The front center prong 23 is bent downward below the arcuate contour 32 from the end of the slit 20 in a sinuous shape comprising an arcuate shaped portion 33 sharply curved at 34 into a 2 shaped portion 35, terminating on the intermediate frame member 14, at which position it is secured by suitable means such as a screw 36.

The side prongs 26—26 of the spring 11 form the rear portion of the upper contour 32 of the spring 11. These prongs 26—26 are fastened to the rear frame member 15 by any suitable means, but preferably as shown, in a manner similar to the fastening of the front side prongs 22—22 as previously described. The center rear prong 27 is formed in an arcuate portion 40 progressively divergent and below the upper surface contour 32 of the spring 11, from the ends of the slits 25—25. This prong 27 is further formed into a V shape, terminating on an intermediate frame member 14, and fastened thereto by suitable means such as a screw 41.

A border wire 42 is positioned within the upper first curve of the sinuous shaped front support portion 29 of the spring 11. This border wire 42 is substantially parallel to the front frame member 13 and passes through the front support portions 29—29 of adjacent spaced springs 11—11 from one side of the spring assembly 10 to the other. The border wire 42 is fastened in contact with each adjacent prong 22—22 by suitable well-known means such as steel clips 43—43. At each side of the spring assembly 10, the border wire 42 is arcuately shaped in plan to provide a spring unit side contour progressively narrowing toward the rear as shown in Fig. 1. As shown in Fig. 2, the border wire 42 is formed to a shape progressively convergent with the upper contour 32 of the springs 11—11 and fastened to the rear frame member 15 by well-known means such as welding or with a slot and hook, as previously described.

In conventional practice, a seat cushion unit (not shown) is built up on the above-described spring assembly 10. An insulator pad is applied over the top of the surface defined by the top of the spaced parallel components 11—11. A cushion material is applied over the insulator pad, such as cotton batting or foam rubber, and upholstering material is applied on top of the cushion material and down the sides of the spring assembly 10, finally being anchored along the edges of the frame members 13, 15, and 16—16.

It is apparent that springs 11 constructed in accordance with this invention offer advantages to the spring art. Arcuate-bowed spring leaf upper-seat contours offer the greatest simplicity in manufacture of seating units. The intermediate support portions of this invention are formed as an integral part of the basic leaf providing a most permanent fastening without producing undesirable stress concentrations, and thus greatly increasing the life of the spring. It is further seen that assembly effort in making connections is no longer necessary.

The particular configuration of the front intermediate support portion 35 of this invention provides advantages also. These advantages are apparent when consideration is given to the function of this component in use. The design is usually established so that the average normal occupancy will occur on the spring 11 at the integral portion 28. Light loading or pressure at this point is resisted almost entirely by the resilient action of the basic leaf. This provides a soft feeling in the initial stages of deflection. As the load is increased and the deflection progresses, the arcuate portion 33 of the front intermediate support portion is brought progressively into conformity with the arcuate shape 32 of the basic leaf, and thus the resistance of this intermediate member is progressively applied. In other words, the load is progressively transferred toward a position of direct vertical alignment over the intermediate member. When the load is directly over the intermediate member, the resistance of this member has its maximum effect. As the front intermediate member deflects, it progressively exerts an increasing resistive force. In this invention, the total effect of these two factors is to provide a load against deflection characteristic or spring rate that varies with the deflection, very soft in the initial stages of deflection and becoming very firm only near maximum deflection. This principle may be applied as a function of design in a spring of this invention to provide very desirable load against deflection characteristics, and a very comfortable seat cushion unit.

The rear intermediate support portion 40 provides increased resistance to deflection of the basic leaf toward the rear of the spring in a progressive manner similar to the action of the front intermediate support portion 35. The characteristic V-shaped configuration shown provides a faster build-up in the spring rate toward the rear of the spring.

In a typical spring assembly featuring the construction of this invention, it has been found that the use of a front intermediate support portion formed to the sinuous arcuate 2 shape, and a rear intermediate portion formed to the V shape, arrests forward sway, which has been a characteristic disadvantage of spring assemblies employing leaf-spring construction.

The material used in this invention could be any which has the necessary resilient properties, but spring-grade steel stock is preferred. This material may be pre-tempered and formed into springs ready for use, or tempering by heat treatment may be done after the springs are formed, whichever is the more desirable in a particular manufacturing situation.

In the embodiment of this invention shown in Figs. 5 and 6, the rear intermediate support portion of the previous embodiment shown has been omitted. In all other respects, the two embodiments shown are the same.

A spring assembly, designated generally as 50, comprises springs 51—51 assembled to a frame 52. The frame 52 comprises a front tubular member 53, intermediate bar member 54, rear tubular member 55, and formed side members 56—56. The lateral frame members 53, 54, and 55 are preferably welded on top of the side members 56—56, as at 57—57, thus providing an integral structural unit. Each spring comprises front side prongs 58—58, which are formed in sinous curved S shaped portions 59 and fastened to the front member 53. Fastening means are shown as spot welds 60—60. The spring 51 is formed to a gradual arcuate shape 61 to the rear frame member 55. A front center prong 62 is bent downward below the arcuate contour 61 from the end of an integral portion 63 in an sinuous shape comprising an arcuate-shaped portion 64 sharply curved at 65 into a 2-shaped portion 66 terminating on the intermediate frame member 54. At this position it is secured by suitable means, such as a spot weld 67. The remainder of the spring comprising the integral portion 63 is shaped to the general arcuate contour 61 of the spring 51 and provides a rear support portion which is fastened to the rear frame member 55 as by spot welds 68.

A border wire 69 is positioned within the upper first curve of the sinuous shaped front support portion 59 of the spring 51. This border wire 69 is substantially parallel to the front frame member 53, and passes through the front support portions 59—59 of adjacent spaced springs 51—51 from one side of the spring assembly 50 to the other. The border wire 69 is fastened in contact with each adjacent prong 58—58 by suitable well-known means such as steel clips 70—70. At each side of the spring assembly 50, the border wire 69 is arcuately shaped in plan to provide a spring unit side contour progressively narrowing toward the rear as shown in Fig. 5. As shown in Fig. 6, border wire 69 is formed to a shape progressively convergent with the upper contour 61 of the springs 51—51 and fastened to the rear frame member 55 by well-known means such as with a steel clip or a slot and hook as previously described.

While it is considered more desirable to eliminate screws, rivets, and welding in making connections in spring assembly, the use of such fastening means at the points of connection to the frame is not critical because deflection under load is slight at this point. However, use of such means are a critical disadvantage at those points where end or intermediate support members meet the basic leaf. Such connections have been eliminated in this invention.

A spring, or spring assembly according to the second embodiment may be preferred in certain circumstances. In many seating applications, forward sway and sudden impacts are not considered a problem of sufficient importance to require the use of more than one intermediate support portion. In general, seats that are characteristically stationary, such as in theatres and furniture, are in this group. In seats that are characteristically in motion, such as in automobiles, and other means of transportation, the first embodiment may be used.

It will be understood, of course, that, while the forms of the invention herein shown and described constitute preferred embodiments of the invention, it is not intended herein to illustrate all of the possible equivalent forms or ramifications of the invention. For instance, it would be within the scope of this invention to slit each spring into only two prongs and form one of these prongs into a front support portion and one into an intermediate support portion. In a like manner, each spring could be slit into any number of prongs, more than two, and either the side or center prong or prongs could be formed into front or intermediate support portions.

A spring assembly could be made comprising a frame and one piece of spring material which is slit into many prongs. In this fashion, a complete upper-spring-assembly-surface and support portions could be made from one piece of material.

It will be understood, that the words used are words of description rather than of limitation, and that various changes, such as changes in shape, relative size, and arrangement of parts may be substituted without departing from the spirit or scope of the invention herein disclosed.

What is claimed is:

1. A leaf spring formed of a single piece of spring material longitudinally slit for a portion of its length from at least one end to provide a plurality of spaced prongs; in which at least one of said prongs is shaped to form an end support portion, at least another one of said prongs is an intermediate support portion formed in a sinuous shape comprising an arcuate portion beginning at the end of the slit in said spring, proceeding below and progressively divergent from said spring, and sharply curved into a 2-shaped portion, said sinuous shape providing progressive convergence of said arcuate portion and said spring to provide progressive application of the resistance of said arcuate portion and of said 2-shaped portion under an increasing load, and the remainder of said spring formed as a support at its opposite end.

2. A spring according to claim 1 wherein said spring is slit into three prongs, comprising two outer prongs and an inner prong, said outer prongs forming said first end support portion, and said inner prong forming said intermediate support portion.

3. A leaf spring formed of a piece of spring material longitudinally slit for a portion of its length from one end to provide a plurality of spaced prongs, at least one of said prongs shaped to form an end support portion, at least another one of said prongs shaped to form an intermediate support portion, said spring extended as one integral piece from said slit portion to the opposite end and shaped to form a support portion at said opposite end.

4. A spring according to claim 3 wherein said intermediate support portion is formed in a sinuous shape, comprising an arcuate portion beginning at the end of the slit in said spring and sharply curved into 2-shaped portion, said sinuous shape providing progressive application of the resistance of said arcuate portion and of said 2-shaped portion under an increasing load.

5. A spring according to claim 4 wherein said first end support portion is resilient and formed to an S shape.

6. A leaf spring formed of a single piece of spring material longitudinally slit for a portion of its length from each end to an integral portion intermediate said ends to provide a plurality of spaced prongs, at least one of said prongs at each end shaped to form an end support portion, and at least another one of said prongs at each end shaped to form an intermediate support portion.

7. A spring according to claim 6 wherein said intermediate support portion is formed in a sinuous shape, comprising an arcuate portion beginning at the end of the slit in said spring, proceeding below and progressively divergent from said spring, and sharply curved into a 2-shaped portion, said sinuous shape providing progressive convergence of said arcuate portion and said spring to provide progressive application of the resistance of said arcuate portion and of said 2-shaped portion under an increasing load.

8. A leaf spring according to claim 7 wherein one of said intermediate support portions is formed to a V shape, terminating at the end of said integral portion.

References Cited in the file of this patent

UNITED STATES PATENTS

| | | |
|---|---|---|
| 147,247 | Drake | Feb. 10, 1874 |
| 1,993,530 | Schaffer | Mar. 5, 1935 |
| 2,115,400 | Schlappritzi et al. | Apr. 26, 1940 |
| 2,202,301 | Probst | May, 28, 1940 |
| 2,302,479 | Tallmadge | Nov. 17, 1942 |
| 2,313,171 | Piliero | Mar. 9, 1943 |
| 2,439,530 | Tea | Apr. 13, 1948 |